(12) United States Patent
Ziegenbein et al.

(10) Patent No.: US 10,480,658 B2
(45) Date of Patent: Nov. 19, 2019

(54) MECHANICAL SEAL ARRANGEMENT HAVING A BELLOWS ELEMENT (71) Applicant: EAGLEBURGMANN GERMANY GMBH & CO. KG, Wolfratshausen (DE)

(72) Inventors: Dieter Ziegenbein, Geretsried (DE); Wolfgang Ries, Bad Kohlgrub (DE); Rudolf Schicktanz, Geretsried (DE); Jörg Thelke, Wolfratshausen (DE); Robert Woppowa, Wolfratshausen (DE); Andreas Eiletz, Wolfratshausen (DE); Peter Haselbacher, München (DE); Elisabeth Brustmann, Wolfratshausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 15/127,440

(22) PCT Filed: Feb. 12, 2015

(86) PCT No.: PCT/EP2015/052973
§ 371 (c)(1),
(2) Date: Sep. 20, 2016

(87) PCT Pub. No.: WO2015/158442
PCT Pub. Date: Oct. 22, 2015

(65) Prior Publication Data
US 2017/0130845 A1 May 11, 2017

(30) Foreign Application Priority Data

Apr. 15, 2014 (DE) .................. 10 2014 207 188

(51) Int. Cl.
F16J 15/36 (2006.01)
F16J 15/34 (2006.01)

(52) U.S. Cl.
CPC ........... F16J 15/36 (2013.01); F16J 15/3464 (2013.01)

(58) Field of Classification Search
CPC ........ F16J 15/34; F16J 15/363; F16J 15/3452; F16J 15/348; F16J 15/3484;
(Continued)

(56) References Cited

U.S. PATENT DOCUMENTS 2,467,239 A * 4/1949 Snyder .................... F16J 15/36
277/392
2,521,137 A * 9/1950 Vedovell .................. F16J 15/36
277/372
(Continued)

FOREIGN PATENT DOCUMENTS

DE 3412594 A1 11/1985
DE 19739398 A1 3/1999
(Continued)

OTHER PUBLICATIONS

Search Report issued in connection with Priority DE Application No. 102014207188.7.
(Continued)

Primary Examiner — Kristina R Fulton
Assistant Examiner — L. Susmitha Koneru
(74) Attorney, Agent, or Firm — Locke Lord LLP; Scott D. Wofsy (57) ABSTRACT The invention relates to a mechanical seal arrangement, comprising a rotating slide ring and a stationary slide ring which define a sealing gap therebetween, and a bellows unit with a bellows element and an intermediate disk, wherein the bellows element has a first connection region, a second
(Continued)

connection region and a bellows intermediate region, wherein the bellows element is produced from an elastomer material and provides a connection between the rotating slide ring and a rotating component, wherein the intermediate disk is arranged between the bellows element and the rotating slide ring, and wherein an inner peripheral region of the intermediate disk is arranged for support on the rotating component.

16 Claims, 5 Drawing Sheets

(58) Field of Classification Search
CPC .... F16J 15/3436; F16J 15/344; F16J 15/3464; F16J 15/36; F16J 15/3256; F16B 43/00; F16B 43/001
See application file for complete search history.

(56) References Cited

U.S. PATENT DOCUMENTS

| | | | | |
|---|---|---|---|---|
| 2,815,967 A * | 12/1957 | Payne | ................ | F16J 15/36 277/315 |
| 3,978,761 A * | 9/1976 | Sosinski | ................ | F16B 31/021 411/5 |
| 4,362,449 A * | 12/1982 | Hlinsky | ................ | B60B 3/145 411/156 |
| 4,479,747 A * | 10/1984 | Pagel | ................ | F16B 39/26 411/427 |
| 4,558,872 A * | 12/1985 | Vossieck | ................ | F16J 15/36 277/379 |
| 4,591,167 A * | 5/1986 | Vossieck | ................ | F16J 15/36 264/299 |
| 4,768,923 A | 9/1988 | Baker | | |
| 5,375,852 A * | 12/1994 | Charhut | ................ | F16J 15/3404 277/371 |
| 5,688,091 A * | 11/1997 | McKinlay | ................ | F16B 39/282 411/136 |
| 5,700,121 A * | 12/1997 | Minola | ................ | F16B 37/02 411/432 |
| 5,725,219 A * | 3/1998 | Gilbert | ................ | F16J 15/36 277/377 |
| 5,747,409 A * | 5/1998 | Commereuc | ................ | B01J 23/36 502/170 |
| 5,797,602 A * | 8/1998 | Less | ................ | F16J 15/348 277/372 |
| 6,220,601 B1 * | 4/2001 | Keller | ................ | F16J 15/36 277/381 |
| 6,655,694 B1 * | 12/2003 | Nakano | ................ | F16J 15/36 277/370 |
| 8,955,848 B2 * | 2/2015 | Roddis | ................ | F16J 15/348 277/370 |
| 2017/0082133 A1 * | 3/2017 | Grosick | ................ | F16B 37/14 |

FOREIGN PATENT DOCUMENTS

| | | | |
|---|---|---|---|
| DE | 102006020114 A1 | 11/2007 | |
| DE | 102008057168 A1 | 5/2010 | |
| EP | 0157097 A2 | 10/1985 | |
| EP | 0547652 A1 | 6/1993 | |
| FR | 2973457 A1 * | 10/2012 | ............ F16B 41/002 |
| WO | WO-2007124950 A1 | 11/2007 | |

OTHER PUBLICATIONS

International Search Report dated May 28, 2015 in connection with PCT/EP2015/052973.

* cited by examiner

MECHANICAL SEAL ARRANGEMENT HAVING A BELLOWS ELEMENT

The present invention relates to a mechanical seal arrangement which has a bellows element and has improved axial resetting behaviour during operation.

Mechanical seal arrangements having bellows elements are known from the prior art in different configurations. The bellows element can be essentially an elastomer bellows or a metal bellows which permits in particular axial resetting of the mechanical seal, e.g. in the event of shaft deflections. It has been established that the resetting behaviour of the mechanical seal arrangement can be impaired particularly when an elastomer bellows is used. Reasons for this are, on the one hand, that a support shoulder of the bellows element can become fixed on a shaft surface or the like by reason of the softness of the elastomer material and therefore is not able to follow axial resetting quickly enough. This occurs all the more if the shaft surface has e.g. dirt thereon which can be produced during operation by debris on the shaft. After a relatively long period of operation of the mechanical seal arrangement this can result in the axial mobility of the bellows element becoming completely blocked. It has also been established that, in conjunction with vibrations which occur during operation, the support shoulder of the elastomer bellows can cause disruption to the resetting behaviour even without any contamination by reason of the increased friction between the elastomer material and the shaft. In this case, these problems described above can cause, during operation, increased leakage at the sealing gap and can even cause a failure in the mechanical seal arrangement.

Therefore, the object of the present invention is to provide a mechanical seal arrangement which has an elastomeric bellows element and has improved resetting behaviour and a self-cleaning function for its entire service life whilst also having a simple design and being simple and cost-effective to produce, in order in particular to avoid a risk of the bellows element becoming jammed or canting during a resetting procedure.

This object is achieved by a mechanical seal arrangement having the features of claim 1. The dependent claims describe preferred developments of the invention.

The mechanical seal arrangement in accordance with the invention having the features of claim 1 has the advantage that an axial mobility of a rotating elastomeric bellows element is significantly improved. As a result, a considerably improved axial resetting behaviour of the mechanical seal arrangement can be achieved, which during operation results in considerably reduced leakage rates, in particular during start-up procedures of the mechanical seal arrangement. In accordance with the invention, this is achieved by virtue of the fact that the mechanical seal arrangement has a bellows unit with a bellows element and a separate annular intermediate disk. The bellows element comprises a first connection region for connecting to a rotating component, such as e.g. a rotating shaft, a second connection region for connecting to a rotating slide ring and a flexible bellows intermediate region which is arranged between the first and second connection region. The bellows element is produced completely from an elastomer material. The intermediate disk is produced from a stiffer material than the elastomer material, in particular from a synthetic material. The annular intermediate disk is arranged on the bellows element such that a first side of the intermediate disk lies against the rotating slide ring, in particular against a rear side of the rotating slide ring, and a second side of the intermediate disk lies against the bellows element, in particular against a step of the bellows element on the second connection region. An inner peripheral region of the intermediate disk lies for support on the rotating component and thus permits an improved, low-friction axial movement for the required resetting behaviour of the bellows unit.

In a particularly preferred manner, the intermediate disk has a multiplicity of recesses on an inner periphery. This provides an intermediate disk with a profiled inner periphery, whereby a support surface of the intermediate disk on the rotating component is reduced. As a result, friction of the intermediate disk on the rotating component can be further reduced and an even better resetting behaviour can be achieved. The recesses are preferably provided in a regular manner on the inner periphery of the intermediate disk. Furthermore, the recesses have preferably an arcuate geometric shape or a substantially rectangular geometric shape. A width of the intermediate disk is preferably constant. Alternatively, a width of the intermediate disk on an inner peripheral region is different to a width on an outer peripheral region. In a particularly preferred manner, the width on the inner peripheral region is greater than the width on the outer peripheral region, as a result of which the intermediate disk is supported in a particularly stable manner on a rotating component.

In accordance with a further preferred embodiment of the present invention, the bellows unit further comprises a first Z-profile bracket and a second Z-profile bracket. The first Z-profile bracket is arranged on an outer side of the first connection region and the second Z-profile bracket is arranged on an outer side of the second connection region. The two Z-profile brackets are formed in an annular manner and have a Z-shaped cross-section with a radially outwardly directed region, an axial region and a radially inwardly directed region. The Z-profile brackets are produced preferably from a metallic material and additionally stiffen the first and second connection regions of the elastomeric bellows element.

In a particularly preferred manner, the second Z-profile bracket which is arranged on the second connection region is arranged in such a manner that in the axial direction of the mechanical seal arrangement the second Z-profile bracket terminates at the same height as the second connection region. This completely stiffens the second connection region, so that in particular a clamping length with which the second connection region of the bellows element clamps the rotating slide ring can be reduced. This leads to a reduction in the axial length of the bellows unit and thus to a desired reduction in the entire axial length of the mechanical seal arrangement.

In accordance with a further preferred embodiment of the invention, the bellows unit further comprises a spring element which pretensions the bellows element in the axial direction. The spring element is preferably a barrel spring. In a particularly preferred manner, the spring element is supported with a first end region on the first Z-profile bracket and is supported with a second end region on the second Z-profile bracket.

To ensure that the intermediate disk is securely fixed on the bellows element, the bellows element preferably has a groove in which the intermediate disk is arranged. As a result, the intermediate disk is assembled simply and fixed securely on the bellows element.

In accordance with a further preferred embodiment of the invention, the intermediate disk has at least one region, which protrudes outwards from the intermediate disk, for locking against rotation. The protruding regions protrude preferably in the axial direction from both sides of the intermediate disk. The protruding regions for locking against rotation also permit a reduction in radial pressing of the rotating slide ring because by reason of the protruding regions the rotating slide ring is already secured to a certain extent on the bellows unit via the intermediate disk.

Preferably, a torque of the rotating component is introduced onto the rotating slide ring exclusively via the bellows unit. As a result, a particularly compact design can be provided.

Also preferably, a radially inwardly directed wall region of the first Z-profile bracket engages over an end of the first connection region directed to the bellows intermediate region. Preferably, a radially inwardly directed wall region of the second Z-profile bracket also engages over an end of the second connection region directed to the bellows intermediate region. As a result, improved stiffness of the elastomeric bellows element and in particular of its two connection regions can be achieved.

Preferably, the bellows element has a non-stick coating.

Preferred exemplified embodiments of the invention will be described in detail hereinafter with reference to the accompanying drawing. Like or functionally identical parts are designated by like reference signs. In the drawing.

Figure 2:
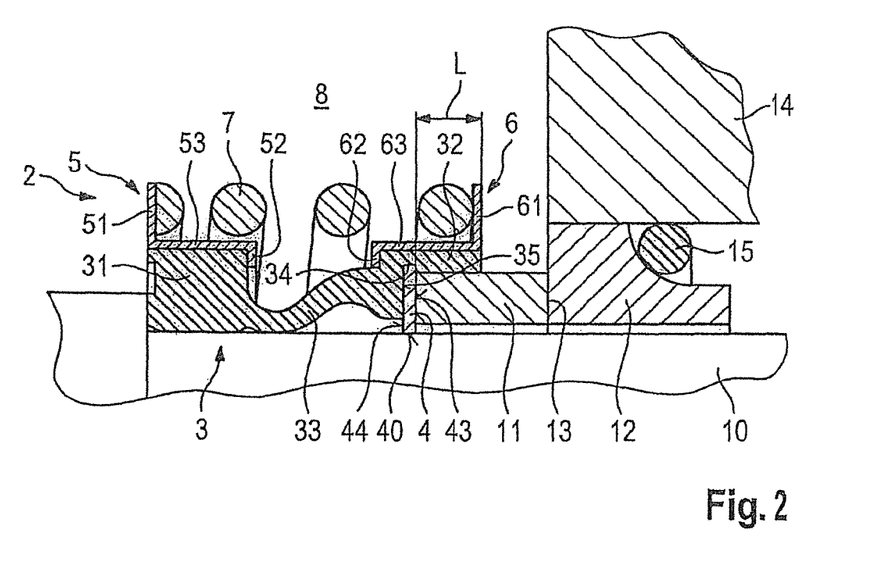
FIG. 2 shows an enlarged detailed view of FIG. 1.
Figure 3:
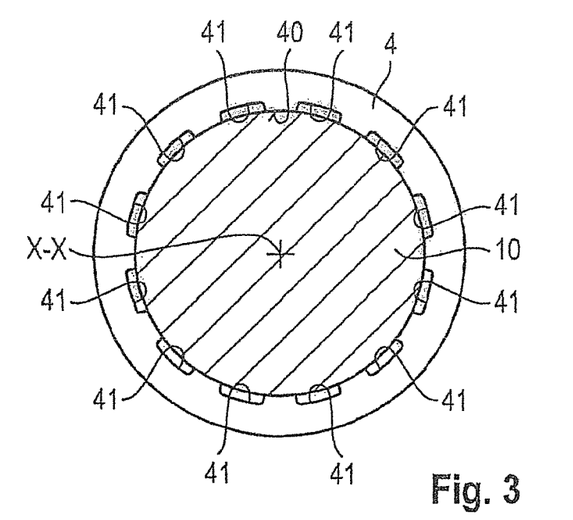
FIG. 3 shows a schematic cross-sectional view of the mechanical seal arrangement of FIG. 1.

A mechanical seal arrangement 1 in accordance with a first exemplified embodiment of the invention will be described in detail hereinafter with reference to FIGS. 1 to 3.

Figure 1:
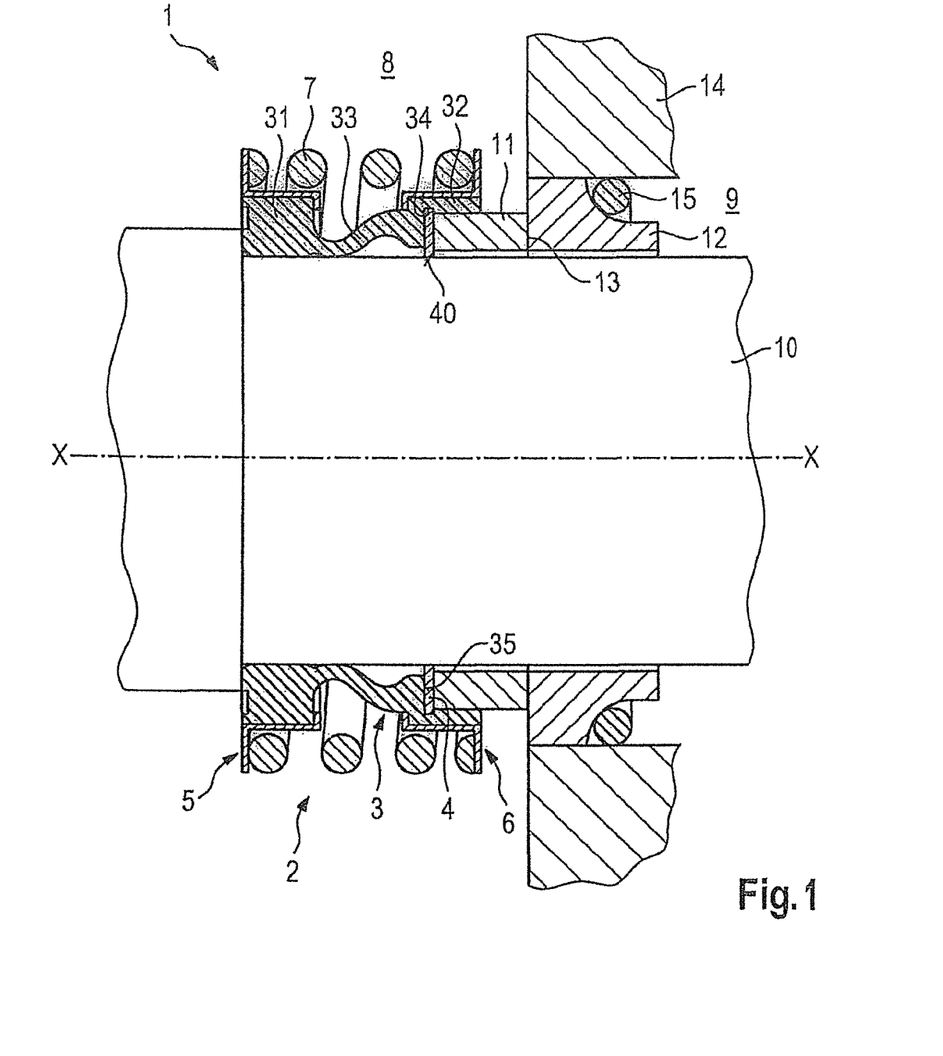
FIG. 1 shows a schematic longitudinal sectional view of a mechanical seal arrangement in accordance with a first exemplified embodiment of the invention.

As can be seen in FIG. 1, the mechanical seal arrangement 1 comprises a rotating slide ring 11 and a stationary slide ring 12 which in a known manner define a sealing gap 13 therebetween. The mechanical seal arrangement 1 serves to seal a first space 8 from a second space 9.

The rotating slide ring 11 is connected to a rotating component 10, a shaft in this exemplified embodiment, and rotates together therewith. The stationary slide ring 12 is connected to a positionally fixed housing 14. Reference sign 15 designates a secondary sealing element for sealing the stationary slide ring 12 with respect to the housing 14.

The mechanical seal arrangement 1 further comprises a bellows unit 2 which establishes the connection between the rotating slide ring 11 and the rotating component 10. The bellows unit 2 comprises a bellows element 3 and a one-piece intermediate disk 4. The bellows element 3 is produced from an elastomer material and comprises a first connection region 31, a second connection region 32 and a bellows intermediate region 33 lying between both connection regions 31, 32. The bellows intermediate region 33 is flexible and allows the bellows element 3 to be lengthened and shortened in the axial direction X-X.

As can be seen in FIG. 1, the bellows element 3 is a one-piece component and serves to seal the rotating slide ring 11. Furthermore, the bellows unit 2 is used for transmitting torque from the rotating component 10 to the rotating slide ring 11.

The bellows unit 2 further comprises a first Z-profile bracket 5 and a second Z-profile bracket 6. The first Z-profile bracket 5 is arranged on the first connection region 31 on the outer diameter thereof. The second Z-profile bracket 6 is arranged on the second connection region 32 on the outer diameter thereof. The two Z-profile brackets 5, 6 have a Z-profile in cross-section.

The first Z-profile bracket 5 comprises a first radially outwardly directed region 51, a first radially inwardly directed region 52 and a first axial region 53. The second Z-profile bracket 6 comprises a second radially outwardly directed region 61, a second radially inwardly directed region 62 and a second axial region 63 (cf. FIG. 2). The first radially inwardly directed region 52 of the first Z-profile bracket engages over an end of the first connection region 31 directed to the bellows intermediate region 33. The second radially inwardly directed region 62 of the second Z-profile bracket 6 engages over an end of the second connection region 32 directed to the bellows intermediate region 33 (cf. FIG. 1). The two axial regions 53, 63 of the two Z-profile brackets 5, 6 lie on the outer diameters of the first and second connection regions 31, 32. As a result, the elastomeric connection regions 31, 32 are compressed.

Furthermore, one end of the second connection region 32 and the second radially outwardly directed region 61 of the second Z-profile bracket 6 are located at the same height in the axial direction X-X, so as to give a planar termination.

The bellows element 3 further comprises a groove 34 on its inner periphery. As can be seen in FIG. 2, the intermediate disk 4 is arranged in the groove 34. An inner peripheral region 40 of the intermediate disk is supported on the outer periphery of the rotating component 10. Furthermore, a multiplicity of recesses 41 are formed on the inner peripheral region 40 (cf. FIG. 3). As a result, a bearing surface of the inner peripheral region 40 on the outer periphery of the rotating component 10 is reduced. The recesses 41 are formed at regular intervals along the periphery of the intermediate disk 4 and have a substantially rectangular geometric shape. However, other geometric shapes of the recess 41 are also possible, e.g. arcuate recesses.

As can be seen in FIG. 1, the annular intermediate disk 4 is arranged between the rotating slide ring 11 and the bellows element 3 such that the intermediate disk 4 lies with a first side 43 against a rearward side of the rotating slide ring 11 and lies with a second side 44 against a step 35 of the bellows element 3. The intermediate disk 4 further has a constant width.

The bellows unit 2 further comprises a pretensioning element 7 which in this exemplified embodiment is a barrel spring. The pretensioning element 7 is supported between the first Z-profile bracket 5 and the second Z-profile bracket 6 and provides permanent pretensioning of the bellows unit 2.

The provision, in accordance with the invention, of the stiff intermediate disk 4 between the elastomeric bellows element 3 and the rotating slide ring 11 can then permit in accordance with the invention an improved axial resetting behaviour of the mechanical seal arrangement 1. During operation of mechanical seals, it is always possible for deposits to form on the outer periphery of the rotating component 10. The use, in accordance with the invention, of the intermediate disk 4 now renders it possible that the bellows element 3 is no longer in contact with the outer periphery of the rotating component 10 in the region of the second connection region 32. In contrast, the intermediate disk 4 which can be produced e.g. from a stable synthetic material can move without adhesion phenomena on the outer periphery of the rotating component 10 and can also remove dirt from the surface of the rotating component. Therefore, the disadvantage—hitherto evident in the prior art—of elastomeric bellows elements in terms of their resetting behaviour after a certain operating period can be overcome by the clever provision of the intermediate disk 4. The intermediate disk 4 also has a lower coefficient of friction than the bellows element 3 and permits a self-cleaning effect of the surface of the rotating component 10 during axial movements. Furthermore, in accordance with the invention a leakage at the sealing gap 13 can be significantly reduced because resetting of the mechanical seal is always possible and the sealing gap width can be kept as small as possible.

The intermediate disk 4 also has the advantage of a possible considerable shortening of the mechanical seal arrangement in the axial direction X-X because a support shoulder, which was hitherto required in the prior art in the case of elastomeric bellows elements and which was provided in the region of the second connection region 32 and supports the bellows element 3 on the rotating component 10, can be omitted. This saves axial installation space. At the same time, the use of the intermediate disk 4 also allows the possibility of clamping the rotating slide ring 11 in the axial direction X-X by means of a longer axial region 63 of the second Z-profile bracket 6 over a longer axial direction (clamping length L) and therefore of reducing radial compression of the rotating slide ring 11 (cf. FIG. 2). This produces positive effects on the rotating slide ring 11 in particular in terms of a possible undesired deformation of the slide surface of the rotating slide ring 11. This deformation can lead to additional undesired leakage at the mechanical seal during operation.

The bellows unit 2 in accordance with the invention thus permits a series of unexpected advantages when using elastomeric bellows elements 3. The bellows unit 2 can be constructed even more compactly in the axial direction X-X. The possibility of shortening the sealing installation length in the axial direction X-X thus provides an extremely significant competitive advantage. Furthermore, the bellows unit 2 in accordance with the invention can also damp the vibrations, which possibly occur during operation, in a problem-free manner and can still operate even after a long operating period by reason of continuously possible axial resetting movements.

Figure 4:
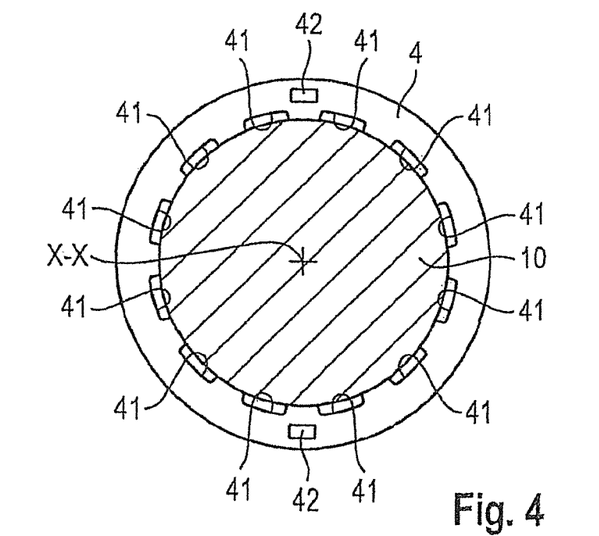
FIG. 4 shows a schematic cross-sectional view of a mechanical seal arrangement in accordance with a second exemplified embodiment of the invention.
Figure 5:
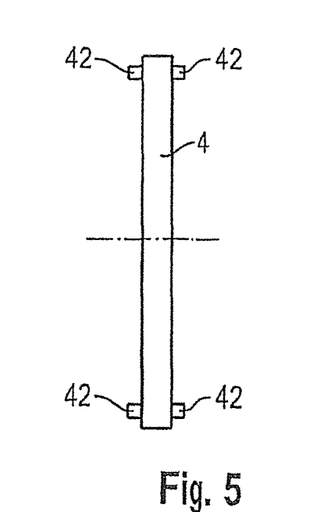
FIG. 5 shows a schematic side view of an intermediate disk of FIG. 4, FIGS. 6 and 7 show schematic views of a second exemplified embodiment of an intermediate disk.

FIGS. 4 and 5 show a mechanical seal arrangement in accordance with a second exemplified embodiment, in which the intermediate disk 4 additionally has regions 42 which protrude in the axial direction X-X. These protruding regions 42 are rotation locking devices which ensure that the intermediate disk 4 does not rotate in the peripheral direction with respect to the bellows element 3 on the one hand and the rotating slide ring 11 on the other hand. Furthermore, the use of the protruding regions 42 for locking against rotation additionally reduces the radial compression of the rotating slide ring 11 because torque transmission from the bellows unit 2 to the rotating slide ring 11 is also rendered possible by the protruding regions 42 directed to the rotating slide ring 11. Correspondingly shaped recesses for receiving the protruding regions 42 can be provided in the rotating slide ring 42 and in the bellows element 3. Otherwise, this exemplified embodiment corresponds to the preceding exemplified embodiment, and therefore reference can be made to the description provided therein.

Figure 6:
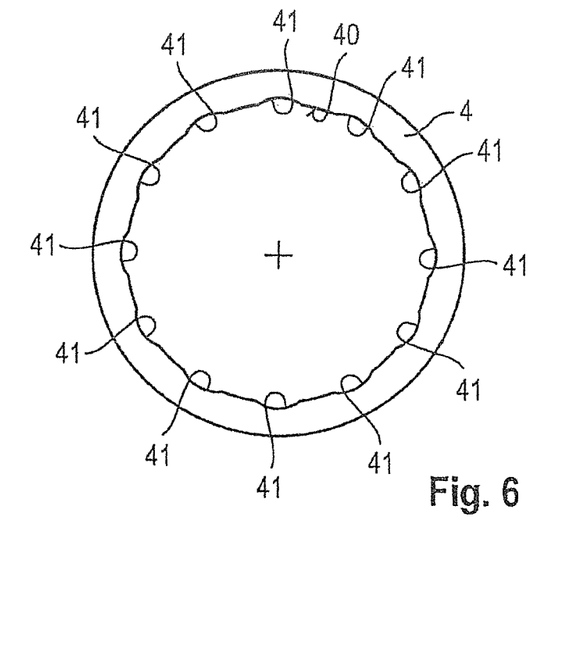
Figure 7:
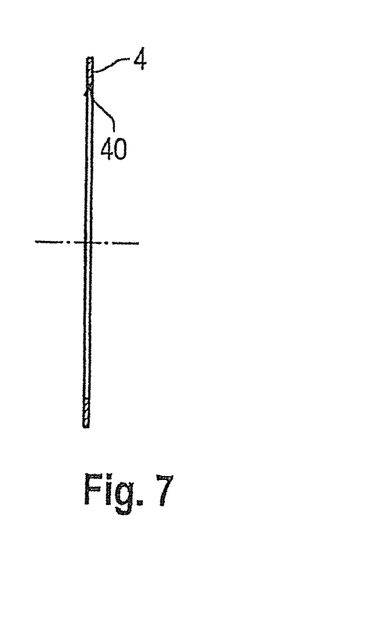

FIGS. 6 and 7 show an alternative intermediate disk 4 for a mechanical seal arrangement in accordance with a second exemplified embodiment, in which the recesses 41 are formed in an arcuate manner on the inner peripheral region 40 of the intermediate disk. The arcuate recesses 41 can be produced in a simple manner, e.g. by a milling cutter. The recesses 41 are arranged at identical intervals along the inner periphery 40. The intermediate disk 4 has a constant width (see FIG. 7).

Figure 8:
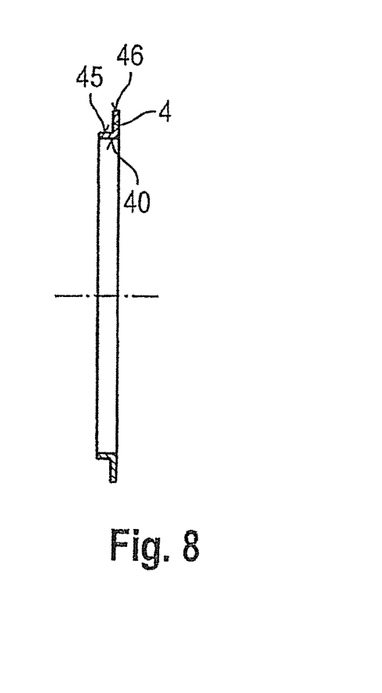
FIGS. 8 and 9 show schematic views of a mechanical seal arrangement in accordance with a third exemplified embodiment.
Figure 9:
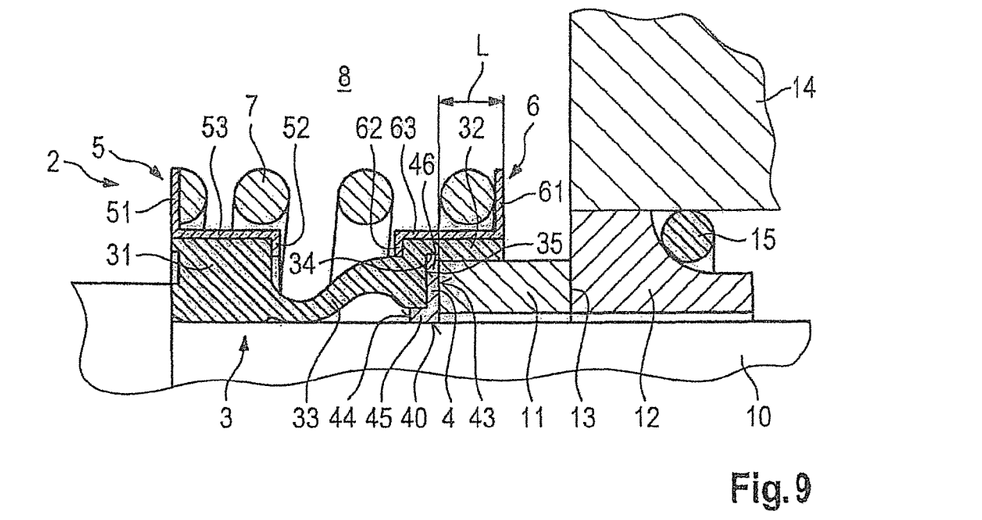

FIGS. 8 and 9 show a mechanical seal arrangement in accordance with a third exemplified embodiment comprising a further alternative intermediate disk 4, in which a step 45 is provided. Therefore, the intermediate disk 4 has a reflected L-shape in cross-section. This produces different widths of the intermediate disk 4 on the inner peripheral region 40 and at an outer peripheral region 46. The step 45 allows the intermediate disk 4 to be supported in a stable manner on the rotating component. The narrower outer peripheral region 46 allows the intermediate disk 4 to be fixed in a simple manner in the elastomeric bellows element. In particular, a wide groove does not have to be provided in the bellows element 3, but instead a small groove for partially receiving the narrow outer peripheral region 46 can be provided, so that the bellows element is not excessively weakened by the groove. Preferably, arcuate recesses 41 are likewise provided on the inner peripheral region 40.

Figure 10:
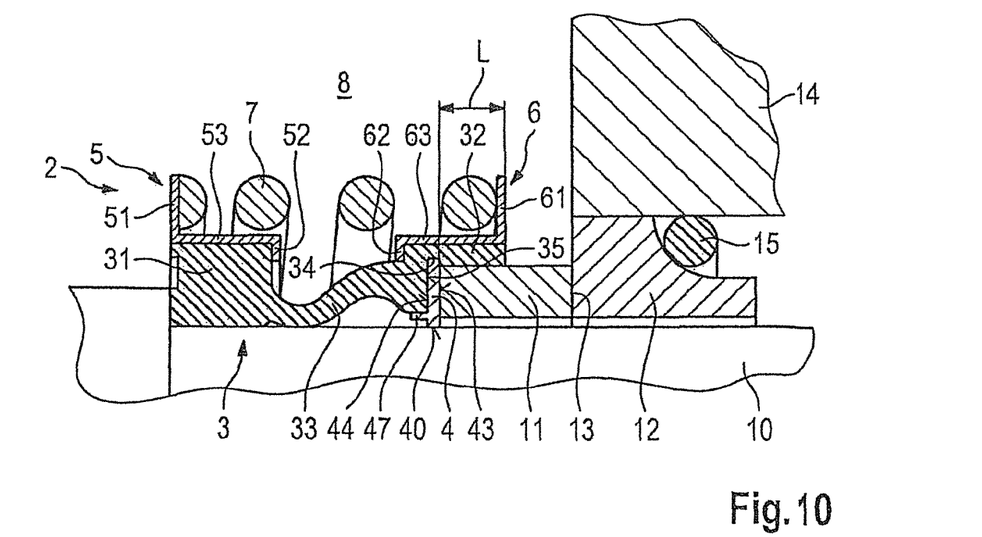
FIG. 10 shows schematic views of a mechanical seal arrangement in accordance with a fourth exemplified embodiment.

FIG. 10 shows a mechanical seal arrangement in accordance with a fourth exemplified embodiment of the invention. The intermediate disk 4 has a support region 47 which supports the bellows element. The support region 47 does not contact the rotating component 10. The intermediate disk 4 is supported on the rotating component only by the narrow inner peripheral region 40.

LIST OF REFERENCE SIGNS 1 mechanical seal arrangement
2 bellows unit
3 bellows element
4 intermediate disk
5 first Z-profile bracket
6 second Z-profile bracket
7 pretensioning element
8 first space
9 second space
10 rotating component/shaft
11 rotating slide ring
12 stationary slide ring
13 sealing gap
14 housing
15 secondary sealing element/O-ring
31 first connection region
32 second connection region
33 bellows intermediate region
34 groove
35 step
40 inner peripheral region
41 recess
42 protruding regions
43 first side
44 second side
45 step
46 outer peripheral region
47 support region 51 first radially outwardly directed region
52 first radially inwardly directed region
53 first axial region
61 second radially outwardly directed region
62 second radially inwardly directed region
63 second axial region
L axial clamping length
X-X axial direction

The invention claimed is:

1. Mechanical seal arrangement, comprising:
a rotating slide ring and a stationary slide ring which define a sealing gap therebetween, and
a bellows unit with a bellows element and an intermediate disk,
wherein the bellows element has a first connection region, a second connection region and a bellows intermediate region,
wherein the bellows element is produced from an elastomer material and provides a connection between the rotating slide ring and a rotating component,
wherein the intermediate disk is arranged between the bellows element and the rotating slide ring, wherein the intermediate disk defines a longitudinal center axis, and wherein the intermediate disk includes a first axial facing surface and a second axial facing surface, wherein the first and second axial facing surfaces are spaced apart from one another along the longitudinal center axis, wherein the intermediate disk defines an inner peripheral region between the first and second axial facing surfaces, wherein the intermediate disk lies with the first axial facing side against a rearward side of the rotating slide ring and lies with the second axial facing side against a step of the bellows element; and
wherein the inner peripheral region of the intermediate disk is arranged for support on the rotating component, wherein a multiplicity of recesses are provided on the inner peripheral region of the intermediate disk to allow for axial movement of the intermediate disk, wherein each of the multiplicity of recesses extends longitudinally from the first axially facing surface to the second axially facing surface,
wherein the intermediate disk has at least one region, which protrudes from the intermediate disk in an axial direction, for locking the intermediate disk against rotation relative to the bellows element and the rotating slide ring.

2. Mechanical seal arrangement as claimed in claim 1, wherein the recesses are arranged at regular intervals on the inner peripheral region of the intermediate disk.

3. Mechanical seal arrangement as claimed in claim 1, wherein the recesses are arcuate.

4. Mechanical seal arrangement as claimed in claim 1, wherein the bellows unit further comprises a first Z-profile bracket and a second Z-profile bracket, wherein the first Z-profile bracket is arranged on an outer side of the first connection region and wherein the second Z-profile bracket is arranged on an outer side of the second connection region.

5. Mechanical seal arrangement as claimed in claim 4, wherein the second Z-profile bracket ends in the axial direction (X-X) at the same height as the second connection region.

6. Mechanical seal arrangement as claimed in claim 1, further comprising a pretensioning element which pretensions the bellows unit in the axial direction (X-X).

7. Mechanical seal arrangement as claimed in claim 6, the pretensioning element is supported with a first end region on the first Z-profile bracket and is supported with a second end region on the second Z-profile bracket.

8. Mechanical seal arrangement as claimed in claim 1, wherein the bellows element has on an inner periphery a groove for receiving the intermediate disk.

9. Mechanical seal arrangement as claimed in claim 1, wherein a torque of the rotating component is introduced exclusively via the bellows unit to the rotating slide ring.

10. Mechanical seal arrangement as claimed in claim 4, wherein a first radially inwardly directed region of the first Z-profile bracket engages over an end of the first connection region directed to the bellows intermediate region and/or in that a second radially inwardly directed region of the second Z-profile bracket engages over an end of the second connection region directed to the bellows intermediate region.

11. Mechanical seal arrangement as claimed in claim 1, wherein the elastomeric bellows element has a non-stick coating or the intermediate disk is produced from a synthetic material.

12. Mechanical seal arrangement as claimed in claim 1, wherein a radial thickness of the intermediate disk at one of the multiplicity of recesses is less than a radial thickness of the intermediate disk in between the multiplicity of recesses.

13. Mechanical seal arrangement as claimed in claim 1, wherein the recesses are substantially rectangular.

14. Mechanical seal arrangement as claimed in claim 1, wherein a width of the intermediate disk defined between the first axial facing surface and the second axial facing surface is less than a width of the rotating slide ring in the axial direction.

15. Mechanical seal arrangement as claimed in claim 1, wherein the intermediate disk and the rotating slide ring are nonoverlapping in the radial direction.

16. Mechanical seal arrangement as claimed in claim 1, wherein the intermediate disk includes a stiffer material than the elastomer material of the bellows element.

* * * * *